(12) United States Patent
Byrd et al.

(10) Patent No.: US 7,660,307 B2
(45) Date of Patent: Feb. 9, 2010

(54) SYSTEMS AND METHODS FOR PROVIDING RECORDING AS A NETWORK SERVICE

(75) Inventors: Steve Byrd, Alpharetta, GA (US); John Bourne, Alpharetta, GA (US); Jamie Richard Williams, Alpharetta, GA (US); Dan Spohrer, Alpharetta, GA (US); Robert John Barnes, Watford (GB)

(73) Assignee: Verint Americas Inc., Melville, NY (US)

( * ) Notice: Subject to any disclaimer, the term of this patent is extended or adjusted under 35 U.S.C. 154(b) by 460 days.

(21) Appl. No.: 11/540,282

(22) Filed: Sep. 29, 2006

(65) Prior Publication Data

US 2008/0005307 A1 Jan. 3, 2008

Related U.S. Application Data

(60) Provisional application No. 60/817,630, filed on Jun. 29, 2006.

(51) Int. Cl.
*H04L 12/24* (2006.01)
(52) U.S. Cl. ................... 370/392; 370/400; 709/238
(58) Field of Classification Search .............. None
See application file for complete search history.

(56) References Cited

U.S. PATENT DOCUMENTS

| | | |
|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |

(Continued)

FOREIGN PATENT DOCUMENTS

EP  0453128 A2  10/1991

(Continued)

OTHER PUBLICATIONS

"Customer Spotlight: Navistar International," Web pae, unverified print date of Apr. 1, 2002.

(Continued)

*Primary Examiner*—Jayanti K Patel
*Assistant Examiner*—Jung Park
(74) *Attorney, Agent, or Firm*—Lawrence A. Aaronson, P.C.

(57) ABSTRACT

Systems and methods for providing recording as a network service are provided. A representative method incorporates: communicating instructions to a network, the instructions indicating that IP packets associated with a communication that is to be recorded are to be directed to long term storage such that the network: receives the instructions; determines whether Internet Protocol (IP) packets, which are being communicated by the network, are associated with a communication that is to be recorded; and directs information corresponding to the IP packets associated with the communication to a long term storage device.

27 Claims, 5 Drawing Sheets

U.S. PATENT DOCUMENTS

| | | |
|---|---|---|
| 5,210,789 A | 5/1993 | Jeffus et al. |
| 5,239,460 A | 8/1993 | LaRoche |
| 5,241,625 A | 8/1993 | Epard et al. |
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Puram et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,574 B1 | 4/2002 | House et al. |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazer |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,871,229 B2 | 3/2005 | Nisani et al. |
| 6,901,438 B1 | 5/2005 | Davis et al. |
| 6,959,078 B1 | 10/2005 | Eilbacher et al. |
| 6,965,886 B2 | 11/2005 | Govrin et al. |
| 7,194,550 B1 * | 3/2007 | Chamdani et al. ............ 709/238 |
| 7,296,080 B2 * | 11/2007 | Rowley et al. ............... 709/231 |
| 2001/0000962 A1 | 5/2001 | Rajan |
| 2001/0032335 A1 | 10/2001 | Jones |
| 2001/0043697 A1 | 11/2001 | Cox et al. |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0128925 A1 | 9/2002 | Angeles |
| 2002/0143925 A1 | 10/2002 | Pricer et al. |
| 2002/0165954 A1 | 11/2002 | Eshghi et al. |

| | | | |
|---|---|---|---|
| 2003/0055883 | A1 | 3/2003 | Wiles et al. |
| 2003/0079020 | A1 | 4/2003 | Gourraud et al. |
| 2003/0118053 | A1* | 6/2003 | Edsall et al. ............... 370/474 |
| 2003/0144900 | A1 | 7/2003 | Whitmer |
| 2003/0154240 | A1 | 8/2003 | Nygren et al. |
| 2004/0100507 | A1 | 5/2004 | Hayner et al. |
| 2004/0111473 | A1 | 6/2004 | Lysenko et al. |
| 2004/0165717 | A1 | 8/2004 | McIlwaine et al. |
| 2004/0250205 | A1* | 12/2004 | Conning .................... 715/517 |
| 2005/0108518 | A1 | 5/2005 | Pandya et al. |
| 2005/0135680 | A1 | 6/2005 | Lee et al. |
| 2005/0180341 | A1 | 8/2005 | Nelson et al. |
| 2006/0168234 | A1 | 7/2006 | Safstrom et al. |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

"DKSystems Integrates QM Perception with OnTrack for Training," Web page, unvereified print date of Apr. 1, 2002, unverified cover date of Jun. 15, 1999.
"OnTrack Online" Delivers New Web Functionality, Web page, unverified print date of Apr. 2, 2002, unverified cover date of Oct. 5, 1999.
"PriceWaterouseCoopers Case Study" The Business Challenge, Web page, unverified cover date of 2000.
Abstract, net.working: "An Online Webliography," *Technical Training* pp. 4-5 (Nov.-Dec. 1998).
Adams et al., "Our Turn-of-the-Century Trend Watch" *Technical Training* pp. 46-47 (Nov./Dec. 1998).
Barron, "The Road to Performance: Three Vignettes," *Technical Skills and Training* pp. 12-14 (Jan. 1997).
Bauer, "Technology Tools: Just-in-Time Desktop Training is Quick, Easy, and Affordable," *Technical Training* pp. 8-11 (May/Jun. 1998).
Beck et al., "Applications of A1 in Education," *AMC Crossroads* vol. 1: 1-13 (Fall 1996) Web page, unverified print date of Apr. 12, 2002.
Benson and Cheney, "Best Practices in Training Delivery," *Technical Training* pp. 14-17 (Oct. 1996).
Bental and Cawsey, "Personalized and Adaptive Systems for Medical Consumer Applications," Communications ACM 45(5): 62-63 (May 2002).
Benyon and Murray, "Adaptive Systems: from intelligent tutoring to autonomous agents," pp. 1-52, Web page, unknown date.
Blumenthal et al., "Reducing Development Costs with Intelligent Tutoring System Shells," pp. 1-5, Web page, unverified print date of Apr. 9, 2002, unverified cover date of Jun. 10, 1996.
Brusilosy et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.
Brusilovsky and Pesin, ISIS-Tutor: An Intelligent Learning Environment for CD/ISIS Users, @ pp. 1-15 Web page, unverified print date of May 2, 2002.
Brusilovsky, "Adaptive Educational Systems on the World-Wide-Web: A Review of Available Technologies," pp. 1-10, Web Page, unverified print date of Apr. 12, 2002.
Byrnes et al., "The Development of a Multiple-Choice and True-False Testing Environment on the Web," pp. 1-8, Web page, unverified print date of Apr. 12, 2002, unverified cover date of 1995.
Calvi and DeBra, "Improving the Usability of Hypertext Courseware through Adaptive Linking," *ACM*, unknown page Nos. (1997).
Coffey, "Are Performance Objectives Really Necessary?" *Technical Skills and Training* pp. 25-27 (Oct. 1995).
Cohen, "Knowledge Management's Killer App," pp. 1-11, Web page, unverified print date of Sep. 12, 2002, unverified cover date of 2001.
Cole-Gomolski, "New Ways to manage E-Classes," *Computerworld* 32(48):4344 (Nov. 30, 1998).
Cross: "Sun Microsystems—the SunTAN Story," Internet Time Group 8 (© 2001).
Cybulski and Linden, "Teaching Systems Analysis and Design Using Multimedia and Patterns," unknown date, unknown source.
De Bra et al., "Adaptive Hypermedia: From Systems to Framework," *ACM* (2000).
De Bra, "Adaptive Educational Hypermedia on the Web," *Communications ACM* 45(5):60-61 (May 2002).
Dennis and Gruner, "Computer Managed Instruction at Arthur Andersen & Company: A Status Report," *Educational Technical* pp. 7-16 (Mar. 1992).
Diessel et al., "Individualized Course Generation: A Marriage Between CAL and ICAL," *Computers Educational* 22(1/2) 57-65 (1994).
Dyreson, "An Experiment in Class Management Using the World-Wide Web," pp. 1-12, Web page, unverified print date of Apr. 12, 2002.
E Learning Community, "Excellence in Practice Award: Electronic Learning Technologies," *Personal Learning Network* pp. 1-11, Web page, unverified print date of Apr. 12, 2002.
Eklund and Brusilovsky, "The Value of Adaptivity in Hypermedia Learning Environments: A Short Review of Empirical Evidence," pp. 1-8, Web page, unverified print date of May 2, 2002.
*e-Learning the future of learning*, THINQ Limited, London, Version 1.0 (2000).
Eline, "A Trainer's Guide to Skill Building," *Technical Training* pp. 34-41 (Sep./Oct. 1998).
Eline, "Case Study: Briding the Gap in Canada's IT Skills," *Technical Skills and Training* pp. 23-25 (Jul. 1997).
Eline "Case Study: IBT's Place in the Sun," *Technical Training* pp. 12-17 (Aug./Sep. 1997).
Fritz, "CB templates for productivity: Authoring system templates for trainers," *Emedia Professional* 10(8):6678 (Aug. 1997).
Fritz, "ToolBook II: Asymetrix's updated authoring software tackles the Web," *Emedia Professional* 10(20): 102106 (Feb. 1997).
Gibson et al., "A Comparative Analysis of Web-Based Testing and Evaluation Systems," pp. 1-8, Web page, unverified print date of Apr. 11, 2002.
Halberg and DeFiore, "Curving Toward Performance: Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," *Technical Skills and Training* pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
Klein, "Command Decision Training Support Technology," Web page, unverified print date of Apr. 12, 2002.
Koonce, "Where Technology and Training Meet," *Technical Training* pp. 10-15 (Nov./Dec. 1998).
Kursh, "Going the distance with Web-based training," *Training and Development* 52(3): 5053 (Mar. 1998).
Larson, "Enhancing Performance Through Customized Online Learning Support," *Technical Skills and Training* pp. 25-27 (May/Jun. 1997).
Linton, et al. "OWL: A Recommender System for Organization-Wide Learning," *Educational Technical Society* 3(1): 62-76 (2000).
Lucadamo and Cheney, "Best Practices in Technical Training," *Technical Training* pp. 21-26 (Oct. 1997).
McNamara, "Monitoring Solutions: Quality Must be Seen and Heard," *Inbound/Outbound* pp. 66-67 (Dec. 1989).
Merrill, "The New Component Design Theory: Instruction design for courseware authoring," *Instructional Science* 16:19-34 (1987).
Minton-Eversole, "IBT Training Truths Behind the Hype," *Technical Skills and Training* pp. 15-19 (Jan. 1997).
Mizoguchi, "Intelligent Tutoring Systems: The Current State of the Art," Trans. IEICE E73(3):297-307 (Mar. 1990).

Mostow and Aist, "The Sounds of Silence: Towards Automated Evaluation of Student Learning a Reading Tutor that Listens" *American Association for Artificial Intelligence*, Web page, unknown date Aug. 1997.

Mullier et al., "A Web base Intelligent Tutoring System," pp. 1-6, Web page, unverified print date of May 2, 2002.

Nash, Database Marketing, 1993, pp. 158-165, 172-185, McGraw Hill, Inc. USA.

Nelson et al. "The Assessment of *End-User Training Needs*," *Communications ACM* 38(7):27-39 (Jul. 1995).

O'Herron, "CenterForce Technologies' CenterForce Analyzer," Web page unverified print date of Mar. 2, 2002, unverified cover date of Jun. 1, 1999.

O'Roark, "Basic Skills Get a Boost," Technical Training pp. 10-13 (Jul./Aug. 1998).

Pamphlet, On Evaluating Educational Innovations[1], authored by Alan Lesgold, unverified cover date of Mar. 5, 1998.

Papa et al., "A Differential Diagnostic Skills Assessment and Tutorial Tool," *Computer Education* 18(1-3):45-50 (1992).

PCT International Search Report, International Application No. PCT/US03/02541, mailed May 12, 2003.

Phaup, "New Software Puts Computerized Tests on the Internet: Presence Corporation announces breakthrough Question Mark™ Web Product," Web page, unverified print date of Apr. 1, 2002.

Phaup, "QM Perception™ Links with Integrity Training's WBT Manager™ to Provide Enhanced Assessments of Web-Based Courses," Web page, unverified print date of Apr. 1, 2002, unverified cover date of Mar. 25, 1999.

Phaup, "Question Mark Introduces Access Export Software," Web page, unverified print date of Apr. 2, 2002, unverified cover date of Mar. 1, 1997.

Phaup, "Question Mark Offers Instant Online Feedback for Web Quizzes and Questionnaires: University of California assist with Beta Testing, Server scripts now available on high-volume users," Web page, unverified print date of Apr. 1, 2002, unverified cover date of May 6, 1996.

Piskurich, Now-You-See-'Em, Now-You-Don't Learning Centers, *Technical Training* pp. 18-21 (Jan./Feb. 1999).

Read, "Sharpening Agents' Skills," pp. 1-15, Web page, unverified print date of Mar. 20, 2002, unverified cover date of Oct. 1, 1999.

Reid, "On Target: Assessing Technical Skills," *Technical Skills and Training* pp. 6-8 (May/Jun. 1995).

Stormes, "Case Study: Restructuring Technical Training Using ISD," *Technical Skills and Training* pp. 23-26 (Feb./Mar. 1997).

Tennyson, "Artificial Intelligence Methods in Computer-Based Instructional Design," Journal of Instructional Development 7(3): 17-22 (1984).

The Editors, Call Center, "The Most Innovative Call Center Products We Saw in 1999," Web page, unverified print date of Mar. 20, 2002, unverified cover date of Feb. 1, 2000.

Tinoco et al., "Online Evaluation in WWW-based Courseware," *ACM* pp. 194-198 (1997).

Uiterwijk et al., "The virtual classroom," *InfoWorld* 20(47):6467 (Nov. 23, 1998).

Unknown Author, "Long-distance learning," *InfoWorld* 20(36):7676 (1998).

Untitled, 10th Mediterranean Electrotechnical Conference vol. 1 pp. 124-126 (2000).

Watson and Belland, "Use of Learner Data in Selecting Instructional Content for Continuing Education," *Journal of Instructional Development* 8(4):29-33 (1985).

Weinschenk, "Performance Specifications as Change Agents," *Technical Training* pp. 12-15 (Oct. 1997).

Witness Systems promotional brochure for eQuality entitled "Bringing eQuality to Business".

Witness Systems promotional brochure for eQuality entitled "Building Customer Loyalty Through Business-Driven Recording of Multimedia Interactions in your Contact Center," (2000).

Aspect Call Center Product Specification, "Release 2.0", Aspect Telecommuications Corporation, May 23, 1998 798.

Metheus X Window Record and Playback, XRP Features and Benefits, 2 pages Sep. 1994 LPRs.

"Keeping an Eye on Your Agents," Call Center Magazine, pp. 32-34, Feb. 1993 LPRs & 798.

Anderson: Interactive TVs New Approach, The Standard, Oct. 1, 1999.

Ante, *Everything You Ever Wanted to Know About Cryptography Legislation ... (But Were to Sensible to Ask)*, PC world Online, Dec. 14, 1999.

Berst. *It's Baa-aack. How Interative TV is Sneaking Into Your Living Room*, The AnchorDesk, May 10, 1999.

Berst. *Why Interactive TV Won't Turn You On (Yet)*, The AnchorDesk, Jul. 13, 1999.

Borland and Davis. *US West Plans Web Services on TV*, CNETNews.com, Nov. 22, 1999.

Brown. *Let PC Technology Be Your TV Guide*, PC Magazine, Jun. 7, 1999.

Brown. *Interactive TV: The Sequel*, NewMedia, Feb. 10, 1998.

Cline. Déjà vu—*Will Interactive TV Make It This Time Around?*, DevHead, Jul. 9, 1999.

Crouch. *TV Channels on the Web*, PC World, Sep. 15, 1999.

D'Amico. *Interactive TV Gets $99 set-top box*, IDG.net, Oct. 6, 1999.

Davis. *Satellite Systems Gear Up for Interactive TV Fight*, CNETNews.com, Sep. 30, 1999.

Diederich. *Web TV Data Gathering Raises Privacy Concerns*, ComputerWorld, Oct. 13, 1998.

*Digital Broadcasting*, Interactive TV News.

*EchoStar, MediaX Mix Interactive Multimedia With Interactive Television*, PRNews Wire, Jan. 11, 1999.

Furger. *The Internet Meets the Couch Potato*, PCWorld, Oct. 1996.

*Hong Kong Comes First with Interactive TV*, SCI-TECH, Dec. 4, 1997.

*Interactive TV Overview TimeLine*, Interactive TV News.

*Interactive TV Wars Heat Up*, Industry Standard.

Needle. *Will the Net Kill Network TV?* PC World Online, Mar. 10, 1999.

Kane. *AOL-Tivo: You've Got Interactive TV*, ZDNN, Aug. 17, 1999.

Kay. *E-Mail in Your Kitchen*, PC World Online, 093/28/96.

Kenny. *TV Meets Internet*, PC World Online, Mar. 28, 1996.

Linderholm. *Avatar Debuts Home Theater PC, PC* World Online, Dec. 1, 1999.

Mendoza. *Order Pizza WhileYyou Watch*, ABCNews.com.

Moody. *WebTV: What the Big Deal?*, ABCNews.com.

Murdorf, et al. *Interactive Television—Is There Life After the Internet?*, Interactive TV News.

Needle. *PC, TV or Both?*, PC World Online.

*Interview with Steve Perlman*, CEO of Web-TV Networks, PC World Online.

Press. Two Cultures, *The Internet and Interactive TV*, Universite de Montreal.

Reuters. *Will TV Take Over Your PC?*, PC World Online.

Rohde. *Gates Touts Interactive TV*, InfoWorld, Oct. 14, 1999.

Ross. *Broadcasters Use TV Signals to Send Data*, PC World Oct. 1996.

Schlisserman. *Is Web TV a Lethal Weapon?*, PC World Online.

Stewart. *Interactive Television at Home: Television Meets the Internet*, Aug. 1998.

Swedlow. *Computer TV Shows*: Ready for Prime Time?, PC World Online.

Wilson. *U.S. West Revisits Interactive TV*, Interactive Week, Nov. 28, 1999.

Notification of Transmittal of the International Search Report and the Written Opinion of the International Searching Authority, dated Jun. 6, 2008.

"Setting up switched port analyzer for monitoring and recording IP-ICD agents on the Cisco ICS 7750", Cisco Systems, Nov. 22, 2002. http://www.cisco.com/en/US/docs/routers/access/ics7750/software/notes/icsspan.html.

"NICE announces the next generation of active VoIP recording solutions", Press Release, NICE Systems, Mar. 14, 2006. http://www.nice.com/news/show_pr.php?id=581.

"NICE Systems announces interoperability of its VoIP recording technology with Cisco Systems' customer contact software platform", Business Wire, Jul. 3, 2001. http://findarticles.com/p/articles/mi_m0EIN/is_2001_July_3/ai_76154034.

"NICE and Cisco ICM/IPCC integration", (Feb. 2003). http://www.cisco.com/en/US/solutions/collateral/ns340/ns394/ns165/ns45/ns14/net_brochure09186a00800a3292.pdf.

Notification Concerning Transmittal of International Preliminary Report on Patentability and Written Opinion of the International Searching Authority, dated Apr. 9, 2009.

* cited by examiner

US 7,660,307 B2

SYSTEMS AND METHODS FOR PROVIDING RECORDING AS A NETWORK SERVICE

CROSS REFERENCE TO RELATED APPLICATIONS

This application is a utility application that is based on and claims priority to U.S. Provisional Application Ser. No. 60/817,630, filed on Jun. 29, 2006, and which is incorporated by reference herein.

BACKGROUND

Recording of communications is important to many industries, particularly those in which compliance regulations have been implemented. In this regard, a traditional passive tap Internet Protocol (IP) recording technique includes recorders that are deployed along routes of communications. In this technique, each recorder operates similar to a "sniffer" by analyzing pass-by communication IP packets. Each recorder detects the packets corresponding to certain communication sessions, locally stores the sessions by gathering the corresponding packets, and then directs the recorded sessions to long term storage. Clearly, interfacing such recorders with the communication network in the proper locations is required to ensure that the desired communications are detected and ultimately recorded.

SUMMARY

Systems and methods for providing recording as a network service are provided. In this regard, an embodiment of such a system comprises a switching device operative to: communicate Internet Protocol (IP) packets of a network with which the switching device is associated; receive instructions indicating that IP packets associated with a communication that is to be recorded are to be directed to long term storage; determine which of the IP packets communicated by the switching device are associated with a communication that is to be recorded; and direct information corresponding to the IP packets associated with the communication to a long term storage device. The switching device is a network infrastructure component configured for directing IP packets.

An embodiment of such a method comprises: communicating instructions to a network, the instructions indicating that IP packets associated with a communication that is to be recorded are to be directed to long term storage such that the network: receives the instructions; determines whether Internet Protocol (IP) packets, which are being communicated by the network, are associated with a communication that is to be recorded; and directs information corresponding to the IP packets associated with the communication to a long term storage device.

A computer-readable media having computer programs stored thereon also are provided. An embodiment of such a computer-readable medium has computer program comprising computer-executable instructions for performing the computer-implemented steps of: communicating instructions to a network, the instructions indicating that IP packets associated with a communication that is to be recorded are to be directed to long term storage such that the network: receives the instructions; determines whether Internet Protocol (IP) packets, which are being communicated by the network, are associated with the communication; and directs the IP packets associated with the communication to a long term storage device.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

As will be described here with reference to several exemplary embodiments, systems and methods for providing recording as a network service are provided. In this regard, some embodiments of such a system involve the use of switching devices, e.g., network switches, network routers and/or other components that form the infrastructure of many communication networks, such as the World Wide Web. Specifically, in these embodiments, the switching devices themselves are capable of performing various functionality that conventionally is provided by recorders, which typically tap into a network, e.g., at a switching device, in order to record communications.

Figure 1:
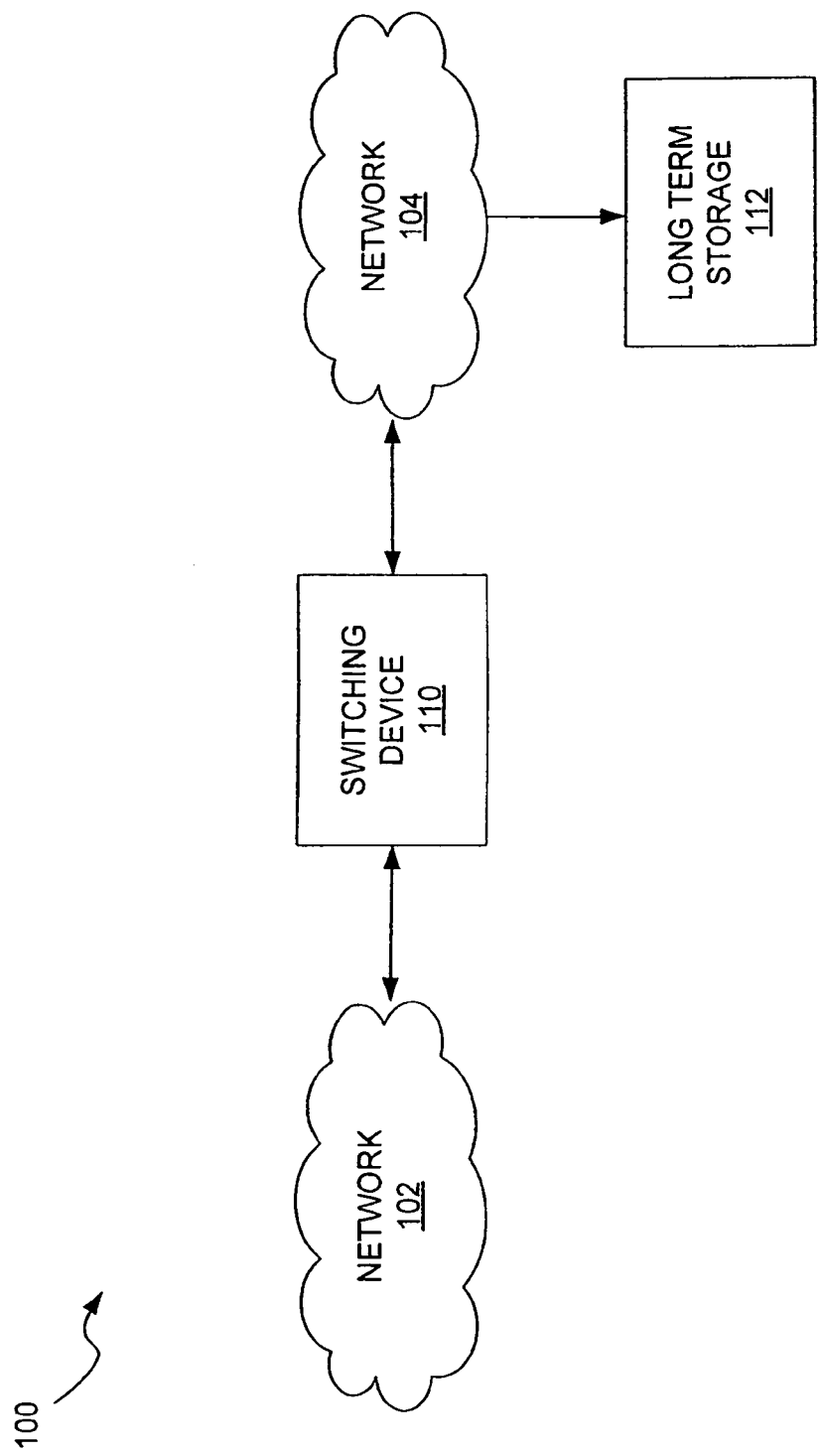
FIG. 1 is a schematic diagram illustrating an exemplary embodiment of a system for providing recording as a network service.

Referring now in detail to the drawings, FIG. 1 is a schematic diagram illustrating an exemplary embodiment of a system for providing recording as a network service. As shown in FIG. 1, system 100 incorporates communications networks 102 and 104. Each of these networks can be any or a combination of network types (WAN, LAN, the Internet) for providing Internet Protocol (IP) communications.

Communicating with each of networks 102 and 104 is a network switching device 110 that can be used for directing IP packets, such as directing IP packets between the networks. For instance, the network switching device can be a network switch, which directs IP packets based on the ports of the switch that receive the packets, or a network router, which directs IP packets based on header information contained in the packets.

Long term storage 112 also communicates with the networks 102, 104 and thus with the switching device 110. By way of example, long term storage 112 can be a storage area network (SAN) or network attached storage (NAS). Long term storage 112 receives IP packets, such as IP packets associated with a communication that is to be recorded, and stores information corresponding to the IP packets so that the recorded communications can be replayed. By way of example, in some embodiments in which the communications involve voice communications, received IP packets could be converted to audio files for storage, or the IP packets themselves could be stored. Notably, various other types of communications could be involved, such as email, chat and/or corresponding screens of data that are displayed during such communications. Clearly, the switching device could forward raw IP packets or re-ordered IP packets (i.e., IP packets arranged for conversion to a file type such as an audio file).

Figure 2:
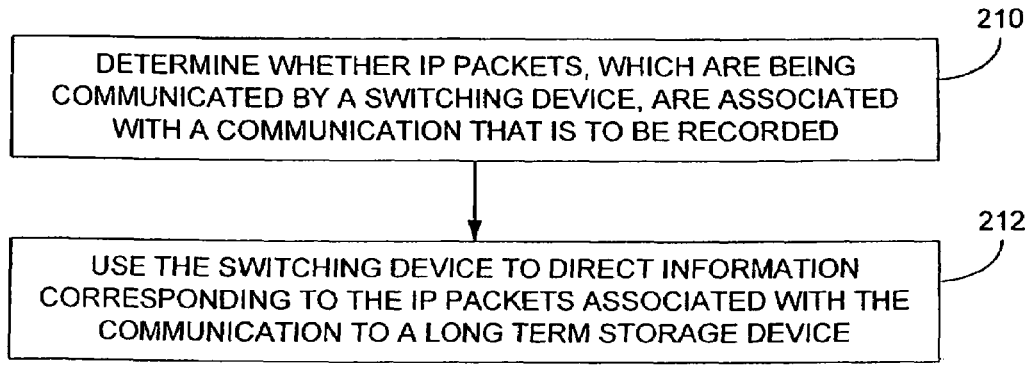
FIG. 2 is a flowchart illustrating functionality (or method steps) that can be performed by the embodiment of FIG. 1.

FIG. 2 is a flowchart illustrating functionality (or method steps) that can be performed by the system 100 of FIG. 1. In particular, as depicted in block 210, a determination is made as to whether Internet Protocol (IP) packets, which are being communicated by a switching device of a network, are associated with a communication that is to be recorded. By way of example, the switching device can be switching device 110, which can be a network router or a network switch.

In determining whether IP packets are associated with a communication that is to be recorded, various techniques can be used. By way of example, embodiments of such a system can incorporate one or more of receiving, filtering, analyzing and storing of the IP packets. In this regard, it should be noted that an IP packet (which can be of various IP versions, e.g., IPv4, Ipv6) incorporates three basic elements, i.e., a header, a data area, and a trailer. The header designates the beginning of the packet, the data area includes the data payload, and the trailer designates the end of the packet.

In some embodiments, the determining step mentioned above can include analyzing of one or more of the three basic elements of the IP-packets received by the system. By way of example, some embodiments can operate in a promiscuous mode, in which each packet received is read in its entirety. Thus, in some embodiments, the device(s) of the system associated with performing the determining step can capture and save the packets for analysis.

Additionally or alternatively, such a system can operate in monitor mode, in which the device(s) of the system associated with performing the determining step wirelessly receive the packets and then act on the packets in a manner similar to the promiscuous mode.

Additionally or alternatively, such a system can operate in non-promiscuous (or normal) mode, in which the device(s) of the system associated with performing the determining step check the address of the packet and merely forward the packet to a next device if the packet is not of interest. Thus, these embodiments perform a type of filtering.

Referring back to FIG. 2, regardless of the manner in which the IP packets for recording are determined, in block 212, the switching device is used to direct the IP packets associated with the communication to a long term storage device that is connected to the network. By way of example, long term storage 112 can be such a device.

Figure 3:
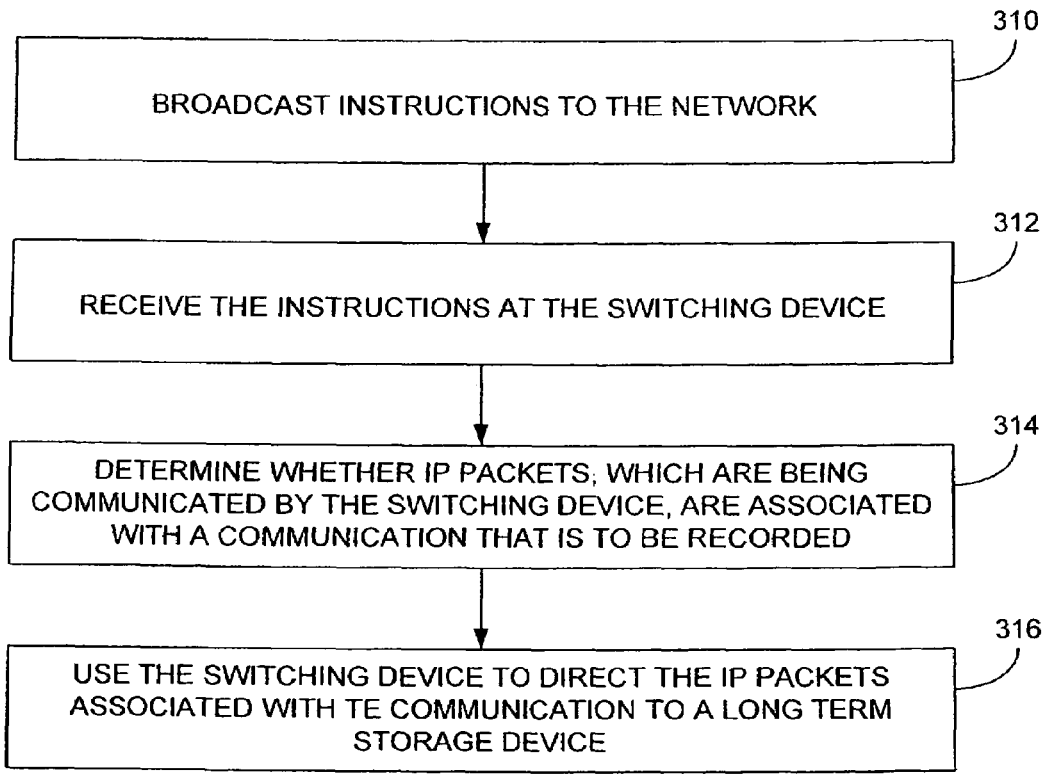
FIG. 3 is a flowchart illustrating functionality (or method steps) that can be performed by another embodiment of a system for providing recording as a network service.

FIG. 3 is a flowchart illustrating functionality (or method steps) that can be performed by another system for providing recording as a network service. In particular, as depicted in block 310, instructions are provided to the network such as via broadcast, multicast, socket connection or other communication transport. The instructions indicate that IP packets associated with desired communications are to be directed to long term storage. For instance, the instructions may indicate that the following exemplary communications are to be recorded: those originating from a particular source; those including a particular source as a party to the communication; those exceeding a particular duration; and those having associated metadata such as ANI or DNIS. Clearly, these types of communications can potentially be identified by information provided with the IP packets used in facilitating the communications. However, other events also can be used to initiate recording. For example, when communications are associated with a contact center, various computer applications may be used in concert with a voice communication, e.g., Voice over IP (VoIP) communication, in order to facilitate an interaction between a contact center agent and a customer. In such a scenario, various triggers provided by one or more of the applications could be used to initiate recording. For instance, when a teleset/softphone is used, a request for recording the voice communication associated with that application could be encoded in instructions that are sent to the network via broadcast, multicast, socket connection or other communication transport.

In block 312, the instructions are received at the switching device. In block 314, a determination is made as to whether Internet Protocol (IP) packets, which are being communicated by the switching device, are associated with a communication that is to be recorded. Notably, the particular communication and/or the criteria for determining whether the communication is to be recorded are contained in the instructions. In block 316, the switching device is used to direct the IP packets associated with the communication to long term storage.

In contrast to conventional methods of recording that use dedicated recorders for tapping communications, using a switching device potentially reduces the latency associated with buffering IP packets in such a recorder prior to the recorder directing the captured data to long term storage. That is, in some embodiments, a switching device may not perform a buffering function at all, instead directing IP packets associated with communications that are to be recorded directly to a network-connected long term storage device without first buffering the packets. In other embodiments, however, some form of buffering could be provided by the switching device depending upon its particular configuration.

Additionally, by streaming information for recording directly to network attached storage, optimal usage of hard disks may be achieved. This is because hard disks used for storage typically are sized for expected load even though such load is difficult to predict. By sharing the hard disks attached to the network, the potential of a single hard disk being over used is diminished.

It should be noted that, in contrast to the embodiment described above with respect to FIG. 3, some embodiments may be provided with instructions for controlling recording by methods other than network broadcast instructions. For instance, the instructions could be directly provided to a switching device and/or provided to the switching device prior to interconnecting the switching device with the network.

Figure 4:
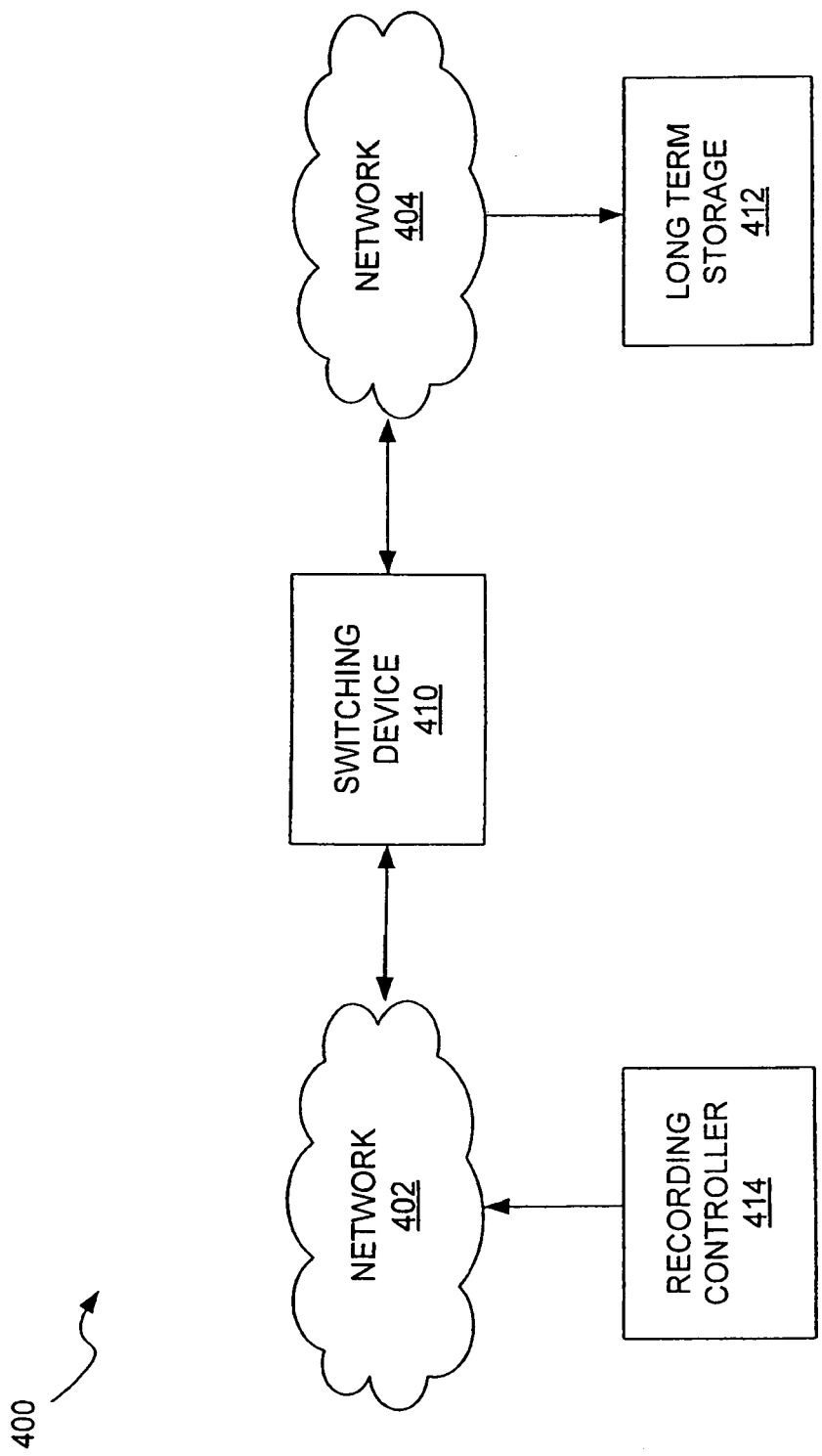
FIG. 4 is a schematic diagram illustrating another exemplary embodiment of a system for providing recording as a network service.

FIG. 4 is a schematic diagram illustrating another exemplary embodiment of a system for providing recording as a network service. As shown in FIG. 4, system 400 incorporates communications networks 402 and 404. Each of these networks can be any or a combination of network types (WAN, LAN, the Internet) for providing Internet Protocol (IP) communications.

Communicating with each of networks 402 and 404 is a network switching device 410 that can be used for directing IP packets. Long term storage 412 communicates with the networks 402, 404 and thus with the switching device 410. Long term storage 412 receives IP packets, such as IP packets associated with a communication that is to be recorded, and stores information corresponding to the IP packets so that the recorded communications can be replayed. In some embodiments, such information could include an identification of the source (e.g., source address), an identification of the destination (e.g., destination address), identification of an agent that is a party to the communication, machine name and/or called phone number, for example.

As shown in FIG. 4, recording controller 414 also is provided. In this embodiment, the recording controller coordinates activity with the switching device to ensure that the desired communications are recorded. In particular, the recording controller can provide instructions to the switching device so that the communications to be recorded can be identified. This can be accomplished by a user interacting with a user interface of the recording controller. Such a user interface enables a user to provide input regarding criteria used for determining whether communications are to be recorded. The recording controller then converts the input into instructions that can be provided to the switching device by broadcast, for example.

Additionally or alternatively, duplicate recording of information can potentially be avoided. In some embodiments, this can be accomplished by permitting the storage devices to communicate with each other regarding recording activity. This could be facilitated via a network protocol. In other embodiments, a recording-controller could be used to track the recording activity of the recording devices and to direct the recording activity. By way of example, the recording controller could inform the network about the recording device(s) that should be used for recording.

Figure 5:
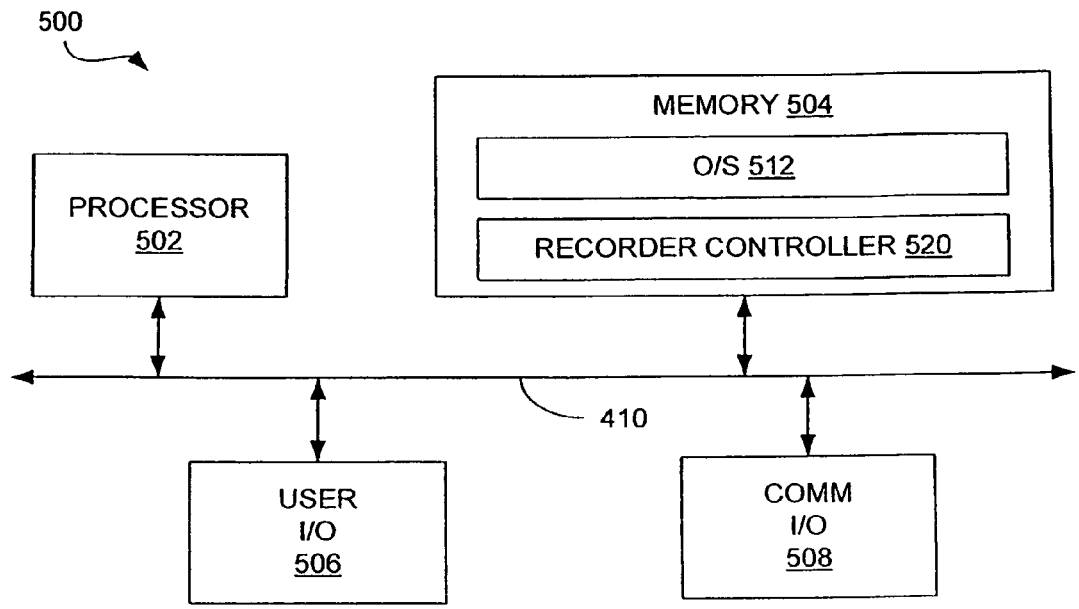
FIG. 5 is a schematic diagram illustrating an embodiment of a computer-implemented device that is configured to perform the functionality associated with a recorder, such as the recorder used in the embodiment of FIG. 4.

FIG. 5 is a schematic diagram illustrating an embodiment of a computer-implemented device that is configured to perform the functionality associated with a recording controller. Generally, in terms of hardware architecture, computer 500 includes a processor 502, memory 504, a user interface 506, and one or more input and/or communication (I/O) device interface(s) 508 that are communicatively coupled via a local interface 510. The local interface can include, for example but not limited to, one or more buses or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor 502 may be a hardware device for executing software, particularly software stored in memory 504. In this regard, the processor can be a custom made or commercially available processor, a central processing unit (CPU), an auxiliary processor among several processors associated with the recorder, a semiconductor based microprocessor (in the form of a microchip or chip set), a macroprocessor, or generally any device for executing software instructions.

The memory 504 can include one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory may incorporate electronic, magnetic, optical, and/or other types of storage media. Note that the memory can have a distributed architecture, where various components are situated remote from one another, but can be accessed by the processor. Additionally, the memory can include an operating system 512, as well as instructions associated with a recording controller 520.

The software in memory may include one or more separate programs, each of which includes an ordered listing of executable instructions for implementing logical functions. The operating system can be configured to control the execution of other computer programs and provides scheduling, input-communication control, file and data management, memory management, and communication control and/or related services.

It should be noted that a system component embodied as software may also be construed as a source program, executable program (object code), script, or any other entity comprising a set of instructions to be performed. When constructed as a source program, the program is translated via a compiler, assembler, interpreter, or the like, which may or may not be included within the memory, so as to operate properly in connection with the operating system.

When the computer 500 is in operation, the processor is configured to execute software stored within the memory, to communicate data to and from the memory, and to generally control operations of the recorder pursuant to the software. Software in memory, in whole or in part, is read by the processor, perhaps buffered, and is then executed. In this regard, when executing instructions associated with the recording controller, the exemplary functionality described above with respect to recording controllers may be performed.

Figure 6:
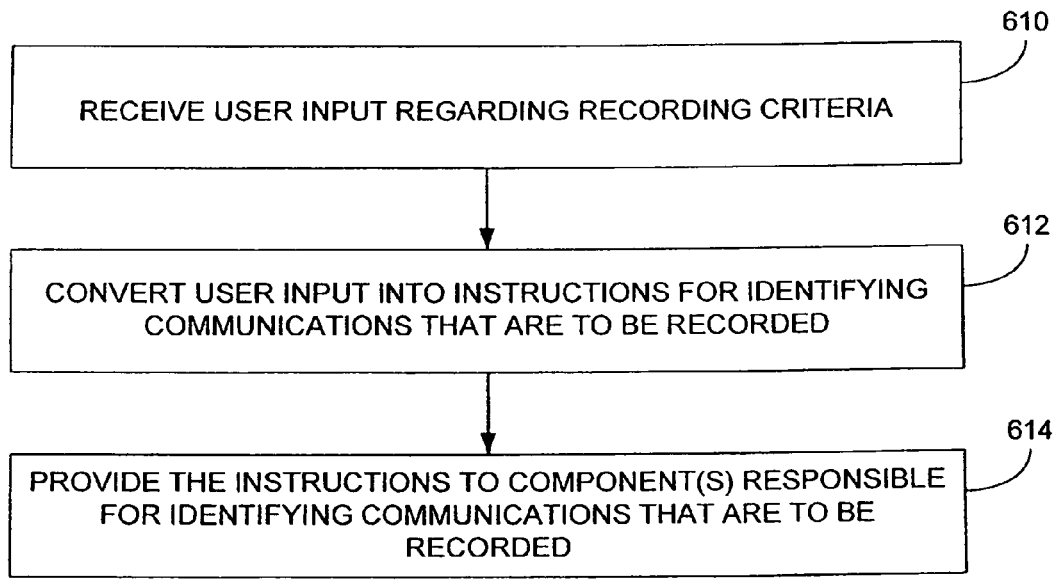
FIG. 6 is a flowchart illustrating functionality (or method steps) that can be performed by the embodiment of FIG. 5.

FIG. 6 is a flowchart illustrating functionality (or method steps) that can be performed by a recording controller, such as the embodiment of FIG. 5. In particular, the functionality may be construed as beginning at block 610, in which user input regarding criteria used for determining whether communications are to be recorded is received. In block 612, the user input is convert into instructions that are operative to enable identification of a communication that is to be recorded. In block 614, the instructions are provided to a component that will be responsible for identifying communications that are to be recorded, such as to a switching device or recorder. Notably, the instructions can be provided in various manners, such as via network broadcast or direct communication to a selected IP address.

Figure 7:
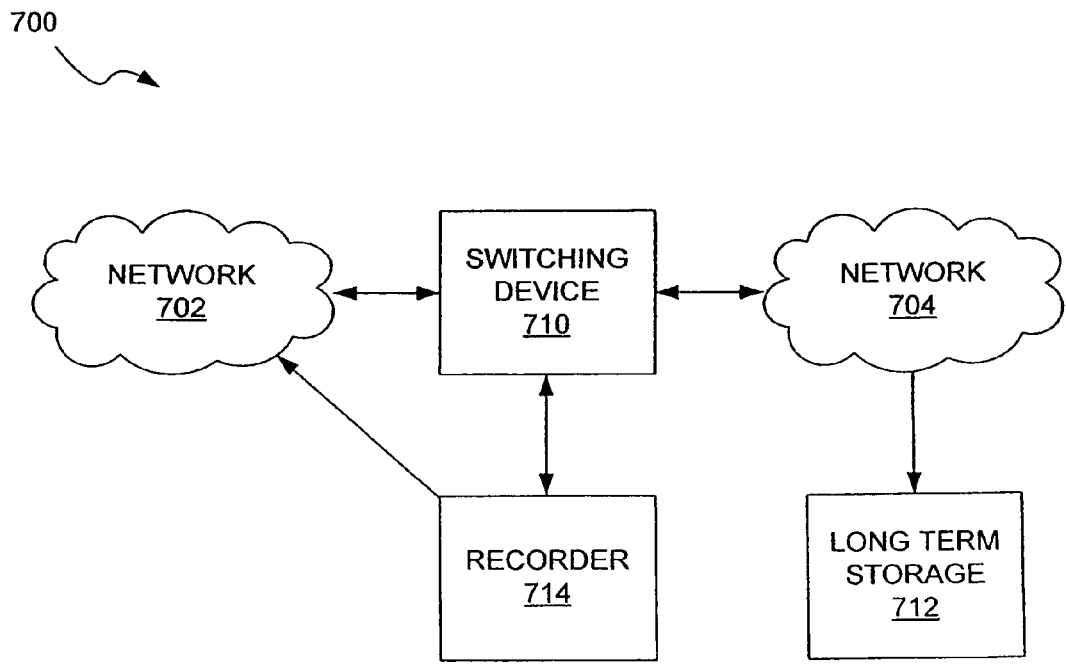
FIG. 7 is a schematic diagram illustrating another exemplary embodiment of a system for providing recording as a network service.

FIG. 7 is a schematic diagram illustrating another exemplary embodiment of a system for providing recording as a network service. As shown in FIG. 7, system 700 incorporates communications networks 702 and 704. Each of these networks can be any or a combination of network types (WAN, LAN, the Internet) for providing Internet Protocol (IP) communications.

Communicating with each of networks 702 and 704 is a network switching device 710 that can be used for directing IP packets. Long term storage 712 communicates with the networks 702, 704 and thus with the switching device 710. Long term storage 712 receives IP packets, such as IP packets associated with a communication that is to be recorded, and stores information corresponding to the IP packets so that the recorded communications can be replayed. Notably, the IP packets received can be copies or some other interpretation of the original IP packets, thereby ensuring that the original packets continue to be routed as desired.

As shown in FIG. 7, a recorder 714 also is provided. In this embodiment, the recorder coordinates activity with the switching device to ensure that the desired communications are recorded. In particular, the recorder can provide one or more of the following functions: instructing the switching device about the communications that are to be recorded; identifying which of the IP packets of the switching device are to be directed for recording; and directing identified IP packets to long term storage.

In some embodiments, the recorder determines which of the IP packets are to be recorded based on the tapping of the switching device and then directs the switching device to direct those packets for long term storage. In other embodiments, responsive to determining which of the IP packets are to be recorded based on the tapping of the switching device, the recorder transmits those packets back to the switching device so that those packets can be directed by the switching device to long term storage.

In such an embodiment, the recorder is somewhat similar to a conventional recorder in that the recorder taps communications. However, unlike a conventional recorder, the recorder of FIG. 7 may not be implemented with an ability to store IP packets locally for the purpose of manipulating, e.g., re-ordering, the packets. That is, in contrast to conventional recorders that buffer IP packets prior to directing those packets to a long term storage device so that the packets can be re-ordered, some embodiments of the recorder selectively direct IP packets to long term storage by re-transmitting the packets to the switching device without re-ordering those packets into a segment of a communication. In other embodiments, however, the IP packets can be held in memory, e.g., volatile memory, while some form of ordering and/or interpretation of the information contained in the IP packets takes place.

Figure 8:
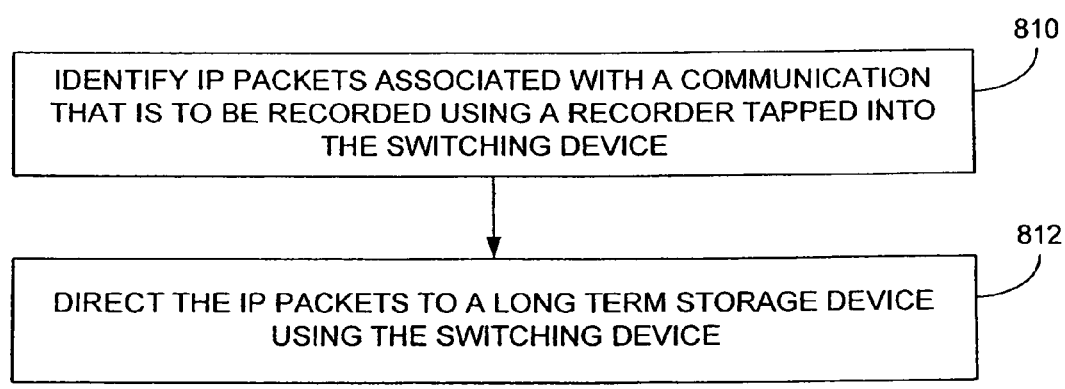
FIG. 8 is a flowchart illustrating functionality (or method steps) that can be performed by the embodiment of FIG. 7.

FIG. 8 is a flowchart illustrating functionality (or method steps) that can be performed by a system, such as the embodiment of FIG. 7. In particular, the functionality may be construed as beginning at block 810, in which IP packets associated with a communication that is to be recorded are identified by a recorder that is tapped into a switching device. In block 812, the IP packets are directed to long term storage device with the switching device.

It should be noted that any of the executable instructions, such as those depicted functionally in the accompanying flowcharts, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of embodiments of this disclosure can include embodying the functionality described in logic embodied in hardware or software-configured media.

It should also be noted that the flowcharts included herein show the architecture, functionality and/or operation of implementations that may be configured using software. In this regard, each block can be interpreted to represent a module, segment, or portion of code, which comprises one or more executable instructions for implementing the specified logical function(s). It should also be noted that in some alternative implementations, the functions noted in the blocks may occur out of the order depicted. For example, two blocks shown in succession may in fact be executed substantially concurrently or the blocks may sometimes be executed in the reverse order, depending upon the functionality involved.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

Therefore, at least the following is claimed:

1. A method for recording communications comprising:
   communicating instructions to a switching device of a network, the instructions indicating that IP packets associated with a communication that is to be recorded are to be directed to long term storage such that the network:
   receives the instructions;
   determines whether Internet Protocol (IP) packets, which are being communicated by the network, are associated with a communication that is to be recorded; and
   directs information corresponding to the IP packets associated with the communication to a long term storage device,
   wherein communicating instructions to the network comprises broadcasting the instructions such that the switching device receives the instructions.

2. The method of claim 1, wherein the switching device of the network directs the information corresponding to the IP packets associated with the communication to the long term storage device.

3. The method of claim 2, wherein directing of the information corresponding to the IP packets to the long term storage is accomplished without using a recorder, which is configured to be tapped into the switching device, for temporarily storing the IP packets.

4. The method of claim 2, wherein the switching device determines whether the IP packets are associated with the communication that is to be recorded.

5. The method of claim 2, wherein, in determining whether IP packets are associated with a communication that is to be recorded, the switching device receives the IP packets in a promiscuous mode.

6. The method of claim 2, wherein, in determining whether IP packets are associated with a communication that is to be recorded, the switching device filters the IP packets.

7. The method of claim 6, wherein the switching device filters the IP packets by operating in a non-promiscuous mode.

8. The method of claim 2, wherein, in determining whether IP packets are associated with a communication that is to be recorded, the switching device analyzes at least some of the IP packets received, with a portion of each of those IP packets being analyzed.

9. The method of claim 2, wherein, in determining whether IP packets are associated with a communication that is to be recorded, the switching device analyzes all of the IP packets received.

10. The method of claim 1, wherein the IP packets associated with the communication contain audio data.

11. The method of claim 1, wherein the IP packets associated with the communication contain video data.

12. The method of claim 1, wherein the IP packets associated with the communication contain screen data captured from a computing device.

13. The method of claim 1, further comprising:
receiving the IP packets associated with the communication at the long term storage device.

14. The method of claim 10, further comprising:
receiving information corresponding to the IP packets at the long term storage device.

15. The method of claim 1, further comprising enabling the communication to be replayed.

16. The method of claim 1, wherein a recorder, which is in communication with the network, determines whether the IP packets are associated with the communication that is to be recorded.

17. The method of claim 1, further comprising receiving the IP packets at a network component to which the IP packets are addressed; and
wherein the determining of whether the IP packets are associated with the communication that is to be recorded is performed by the network component.

18. A computer-readable medium having a computer program stored thereon, the computer program comprising computer-executable instructions for performing the computer-implemented steps of:
communicating instructions to a network switch, the instructions indicating that IP packets associated with a communication that is to be recorded are to be directed to long term storage such that the network:
receives the instructions;
determines whether Internet Protocol (IP) packets, which are being communicated by the network, are associated with the communication; and
directs the IP packets associated with the communication to a long term storage device,
wherein communicating instructions to the network comprises broadcasting the instructions.

19. The computer-readable medium of claim 18, further comprising:
receiving user input regarding criteria used for determining whether communications are to be recorded; and
converting the input into the instructions.

20. A system for providing recording as a network service comprising:
a switching device operative to:
communicate Internet Protocol (IP) packets of a network with which the switching device is associated;
receive broadcast instructions to the network indicating that IP packets associated with a communication that is to be recorded are to be directed to long term storage;
determine which of the IP packets communicated by the switching device are associated with a communication that is to be recorded based upon the instructions received; and
direct information corresponding to the IP packets associated with the communication to a long term storage device;
wherein the switching device is a network infrastructure component configured for directing IP packets.

21. The system of claim 20, wherein the information corresponding to the IP packets comprises the IP packets.

22. The system of claim 20, further comprising the long term storage device to which the IP packets are directed.

23. The system of claim 20, further comprising means for facilitating identification of the IP packets associated with the communication.

24. The system of claim 20, further comprising a recorder communicating with the switching device, the recorder being operative to facilitate identification of the IP packets associated with the communication.

25. The system of claim 24, wherein the recorder is operative to transmit the IP packets for recording back to the switching device such that the switching device directs the IP packets transmitted from the recorder to long term storage.

26. The system of claim 20, wherein the switching device is operative to receive the instructions from a recorder, which is in communication with the switching device.

27. The system of claim 20, further comprising a user interface operative to:
receive user input regarding criteria used for determining whether communications are to be recorded; and convert the input into the instructions.

* * * * *